United States Patent [19]

Ema et al.

[11] Patent Number: 4,983,097
[45] Date of Patent: Jan. 8, 1991

[54] TRAY TIER STACKING APPARATUS

[75] Inventors: Hideyuki Ema, Moriguchi; Kazuichi Yamashita, Kyoto; Kiyoshi Matsuura, Neyagawa, all of Japan

[73] Assignee: Matsushita Electric Industrial Co., Ltd., Osaka, Japan

[21] Appl. No.: 413,388

[22] Filed: Sep. 27, 1989

[30] Foreign Application Priority Data

Sep. 29, 1988 [JP] Japan ................. 63-244905

[51] Int. Cl.$^5$ ............................. B65G 59/06
[52] U.S. Cl. .................... 414/795.2; 414/797.5; 74/128; 74/577 S; 74/578
[58] Field of Search ............ 74/128, 153, 577 S, 74/578; 414/795.2, 795.3, 794.9, 797.5, 929, 933

[56] References Cited

U.S. PATENT DOCUMENTS 3,363,781 1/1968 Magnetti ............... 414/795.2 X
3,858,732 1/1975 Kemper ............... 414/795.2 X

FOREIGN PATENT DOCUMENTS 2143807 3/1973 Fed. Rep. of Germany ... 414/795.2
1415732 9/1965 France ............................. 414/795.2
0254423 11/1986 Japan ............................. 414/795.2
0302379 4/1971 U.S.S.R. ......................... 414/795.2
1574036 9/1980 United Kingdom ............. 414/795.2

Primary Examiner—Robert J. Spar
Assistant Examiner—James T. Eller, Jr.
Attorney, Agent, or Firm—Wenderoth, Lind & Ponack

[57] ABSTRACT

A tray stacking apparatus includes a pawl having a projection piece, a roller for opening the pawl, a roller for returning the pawl, and an urging device for urging the pawl into an open position or a closed position. The pawl is opened during its descent, and is returned to its original closed position at a bottom limit position. The tray stacking operation is effected by one driving operation without the pawl rubbing against the tray and thus, powder is not produced by a rubbing of the pawl against the tray so that a clean working environment may be maintained.

3 Claims, 5 Drawing Sheets

TRAY TIER STACKING APPARATUS

BACKGROUND OF THE INVENTION

The present invention generally relates to a tray tier stacking apparatus for sequentially stacking trays one by one, which trays are adapted to align, store and feed components.

Conventionally, components were stored, aligned, and fed by the use of a vibration feeder or the like during a feeding operation of the components in an assembly line and so on. When the precision components such as semiconductors, which are likely to be affected by vibrations and shocks, are handled or a plurality of components engaged previously are to be provided with compound components, the alignment and the feeding thereof cannot be effected because in the vibration feeder the compound components are mutually entangled because of the complicated shapes thereof. Thus, the vibration feeder cannot be used. In order to solve the problem, a feeding system is employed in which the components are fed to an assembly station while accommodated in a tray. After being loaded, the tray with each component is moved under a numerical value control to a feeding station. The tray has an indentation for establishing an aligned position of the tray at the feeding station. The orientation of the components is set by the placement thereof on the inner side bottom face of the square tray-shaped containers (trays) composed of soft material such as vesicatory sterol or the like. As many trays are required to facilitate mass production, the trays with components loaded therein and the trays after the components have been fed therefrom are often stacked. A conventional tier stacking apparatus for stacking such trays has the structure shown in FIG. 4. Also, the tray tier stacking operation is shown in FIG. 5. Namely, as shown in FIG. 5(a), a pawl 101 supports a tier 14 of trays already stacked and a new tray 15 in a raised condition is fed below the tier 14 by moving, placing apparatus 21. As shown in FIG. 5 (b), the pawl 101 is lowered to place the tray tier 14 on the tray 15. Furthermore, as shown in FIG. 5 (c), the pawl 101 lowers. The tip end 101a of the pawl 101 is inserted into a stepped portion 20, rubbing against the side face of the tray 15. Then, the pawl 101 adds the tray 15 to the tray tier 14 and is raised. The trays are adapted to be sequentially stacked one by one by the repetition of this operation.

However, in such an apparatus as described hereinabove, the pawl rubs against the side face of the tray when it is lowered and produces powder from the grinding of the tray. Thus, there is a problem in that this apparatus cannot be used in a clean environment in which powder should not be produced. Also, although it has been attempted to solve the above-described problem by the use of a plurality of driving apparatuses which move the pawl in both vertical and lateral directions so as to prevent such rubbing of the trays as described hereinabove, the cost of such apparatuses is high and the space required to accommodate such apparatuses is large.

SUMMARY OF THE INVENTION

Accordingly, an object of the present invention is to provide a tier stacking apparatus for preventing powder from being produced in the machine, in which a pawl is lowered without being rubbed against the tray by a single driving apparatus, is then inserted into a stepped portion of the tray, and is subsequently raised to in turn raise the tray.

In accomplishing these and other objects, according to one preferred embodiment of the present invention, the tier stacking apparatus of the present invention has a projection piece on a pawl thereof, a roller for opening the pawl, a roller for returning the pawl, an urging means for urging the pawl to a position in which the pawl is open (separated from the tray) or a position in which the pawl is closed (for supporting the tray). The pawl is adapted to be opened during its descent, and to return to the closed position when at a bottom limit position.

By the above-described operation of the present invention, the pawl is lowered and is opened after a tier of trays has been placed onto a new tray and prior to the pawl reaching the bottom limit position so that the pawl does not rub against the tray. Then, the pawl is returned to the original closed position and is inserted into the stepped portion of the new tray. As a result, the tier stacking operation is effected by one driving operation without the pawl rubbing against the tray, and powder is not produced. Thus, the present invention is suitable for maintaining a clean environment.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENT

Figure 1:
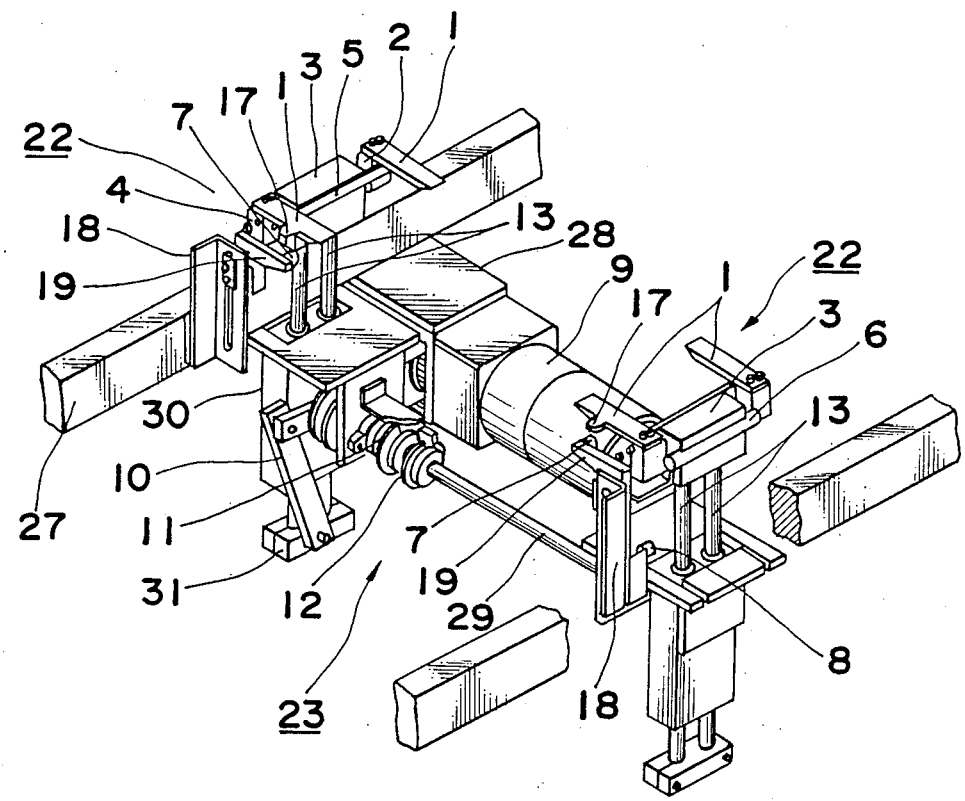
FIG. 1 is a perspective view of one embodiment of a tray tier stacking apparatus according to the present invention.

Before the description of the present invention proceeds, it is to be noted that like parts are designated by like reference numerals through the accompanying drawings.

Figure 2A:
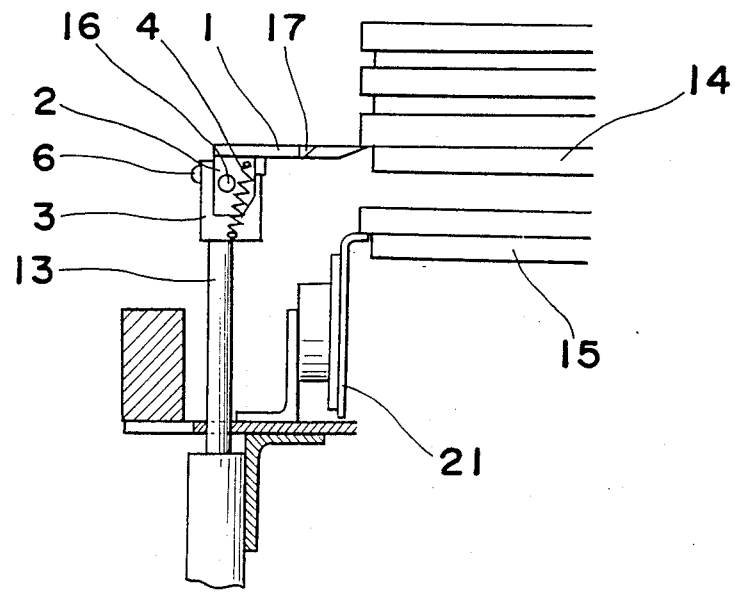
FIGS. 2 (a), (b), (c), (d), and (e) are operating diagrams illustrating the operation of the pawl of the tray tier stacking apparatus of FIG. 1.
Figure 2B:
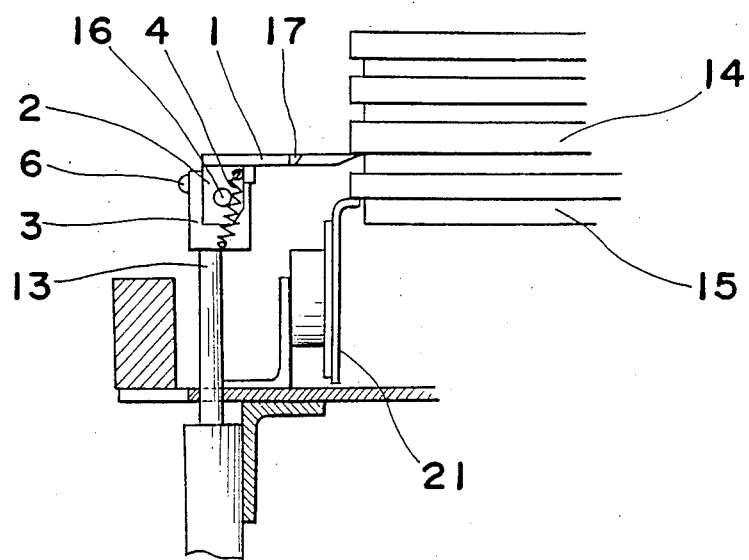
Figure 2:
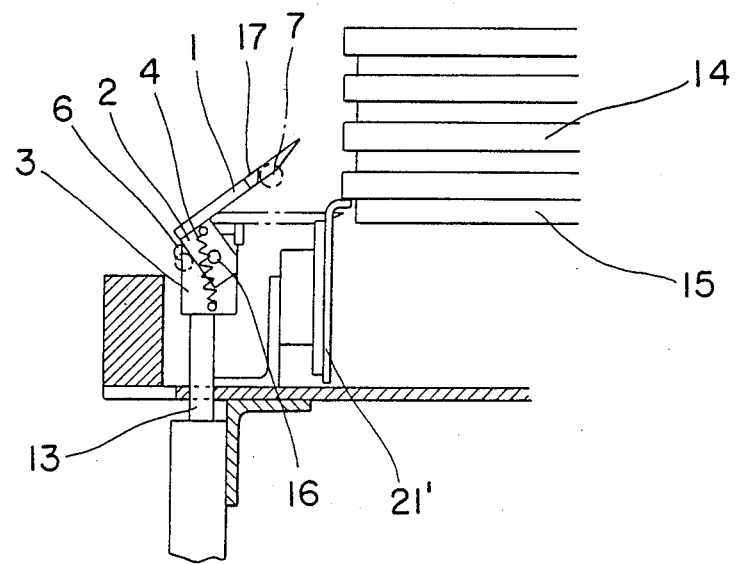
Figure 2:
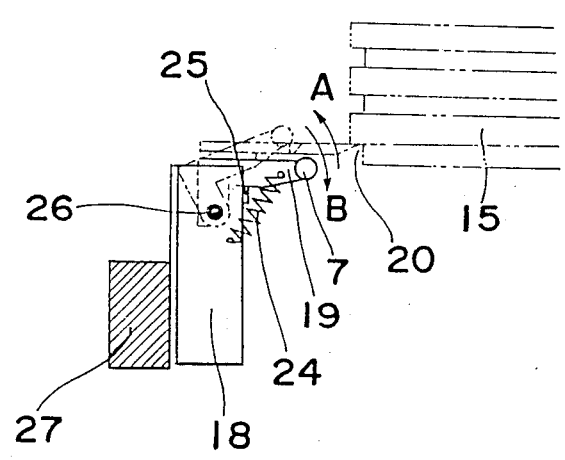
Figure 2:
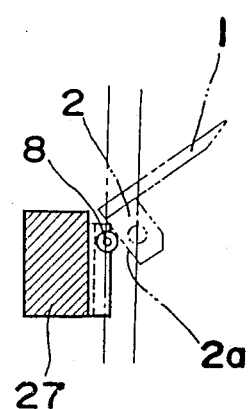
Figure 4:
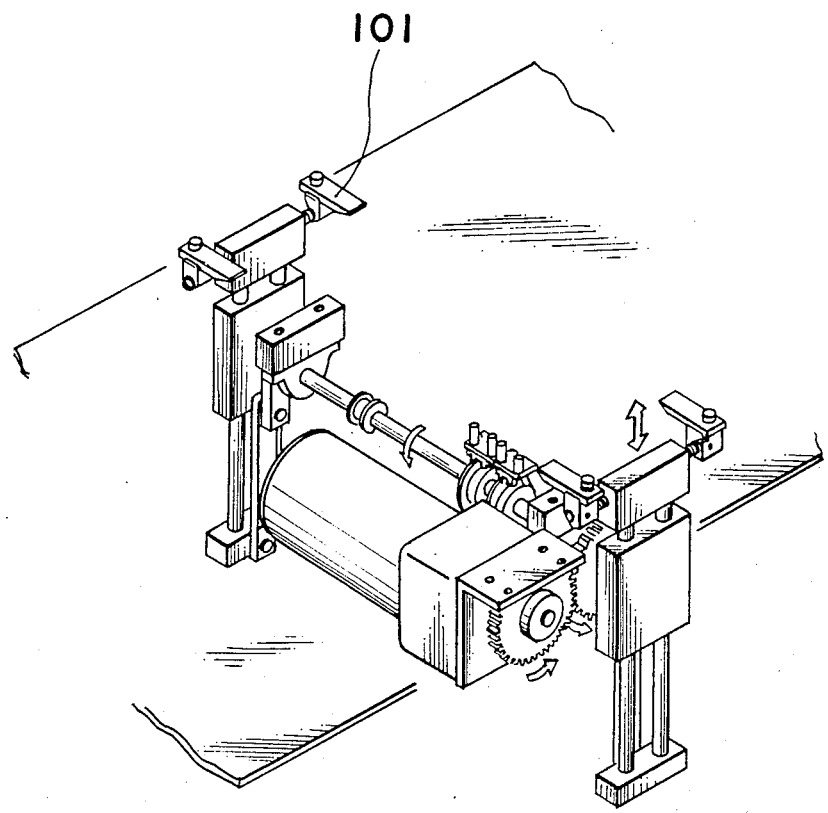
FIG. 4 is a perspective view of the conventional tray tier stacking apparatus.
Figure 5A:
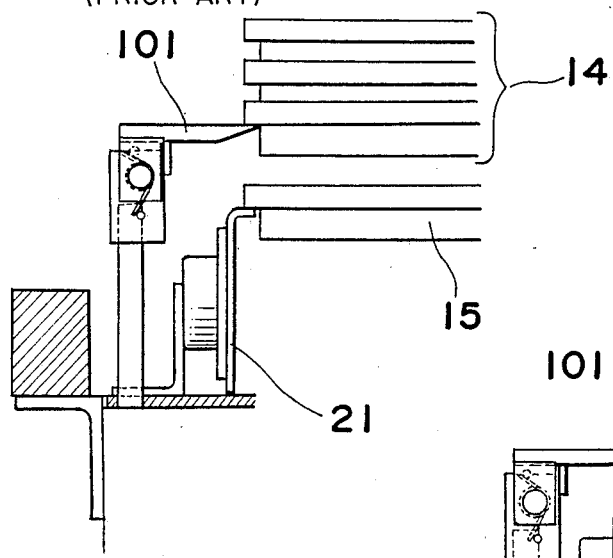
FIGS. 5 (a), (b), and (c) are operating diagrams illustrating the operation of the pawl in the conventional tray tier stacking apparatus.
Figure 5B:
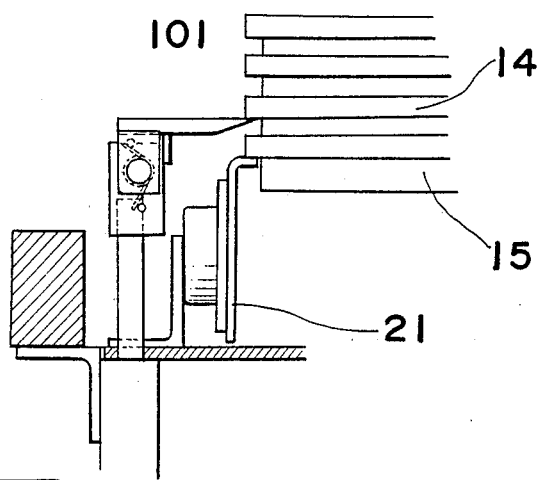
Figure 5C:
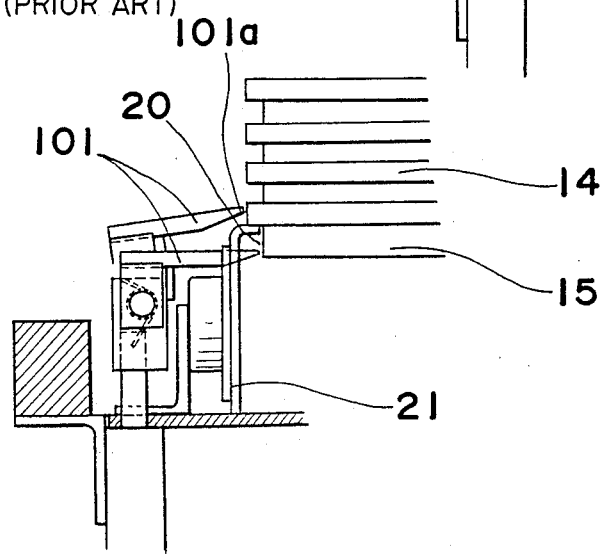

Referring now to the drawings, there is shown in FIGS. 1 and 2(a)-2(e), a tray tier stacking apparatus according to one preferred embodiment of the present invention, which includes tier stacking apparatus portions 22 and a vertical driving portion 23. As the right and left tier stacking apparatus portions 22 have the same structure, only one such portion will be described in detail. In the tier stacking apparatus portion 22, a pair of pawls 1 for retaining the trays are provided in a mutual parallel relation. They are respectivel integrated with blocks 2 for supporting the pawls, and furthermore, are coupled with a housing 3 and one shaft 16. Each pawl 1 and the block 2 supporting the pawl are rotatable around the shaft 16. As shown in FIGS. 2(a), (b), and (c), the position thereof is determined by the direction of tension generated by a tension spring 4 engaged between a block 2 and housing 3, and through the contact of the pawls 1 with a returning stopper 5 provided on the front face (on the side facing the tray) of the housing 3 or through the contact of the pawls 1 with an opening stopper 6 provided on the rear side of the housing 3. Also, a projection piece 17 is provided on one side of the pawl 1 at the tip thereof. A roller 7 for opening the pawl contacts the underside of projection piece 17 during a lowering of the block 2 in which the housing 3 is moved vertically downward as driven by the vertical driving portion 23 as shown in FIG. 2(c). As shown in FIG. 2(d), the roller 7 for opening the pawl is mounted at the tip end of a bracket 19 mounted on a support member 18 secured to fixed frame 27. Bracket 19 is rotatable about pivot point 26 in the direction of arrow A against the urging force of spring 24, but is non-rotatable owing to stopper 25 in the direction of arrow B. As shown in FIG. 2(e), a roller 8 comes into sliding contact against the rear face 2a of the block 2 when the pawl 1 is lowered to a given position with the pawl being open, to close the pawl 1. Roller 8 is located at a set position to the rear of the block 2 along the vertical path thereof.

The vertical driving portion 23 for vertically moving the housing 3 is disposed under the tier stacking apparatus portions 22. The vertical driving apparatus 23 comprises a driving motor 9, a reduction gear mechanism 28 for transmitting the revolution of the driving motor 9 to an inverted shaft 29, a pair of coupling shafts 13 which are guided for movement in a vertical direction by a guide member 30 and support the housing 3 at the top end thereof, and a link mechanism 10 rotatably coupled to a coupling member 31. Coupling member 31 is coupled at one end to the inverted shaft 29, and is mounted at its other end to the bottom end of the coupling shaft 13. The rotary motion generated by the driving motor 9 is converted into linear motion by the link mechanism 10 through the reduction mechanism 28, so that the housing 3 supporting the pawl 1 is adapted to undergo vertical movement. A respective link mechanism 10 is provided on the right and left tier stacking apparatus portions 22 although only one link mechanism 10 is shown in FIG. 1 for the sake of simplicity.

Figure 3:
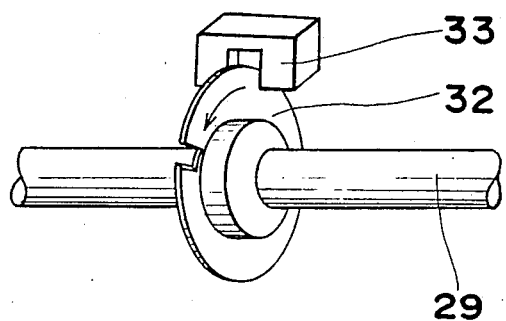
FIG. 3 is a schematic diagram of a detector for establishing top and bottom limit positions of the pawl.

The adjustment and detection of the top limit, bottom limit positions of the housing 3 moved by the vertical driving portion 23 are effected by a top limit detector 11 and a bottom limit detector 12. As shown in FIG. 3, the top limit detector 11 and the bottom limit detector 12 each comprise a notched disc 32 mounted on the inverted shaft 29 rotated by the driving motor 9, and a photoelectric detector 33 having a light emitting portion and a light receiving portion interposing the notched disc 32. The normal rotation, the reverse rotation and the stoppage of the driving motor 9 is controlled in accordance with a signal from the photoelectric detector 33 so as to regulate the vertical movement of the housing 3.

The operation of the tray tier stacking apparatus having the above structure will now be described.

As shown in FIG. 2(a), as the tray 15 is carried by a moving, placing apparatus 21 and is positioned at a tray stacking location, and the pawl 1 with tray tiers 14 already thereon starts to be lowered. The tray tier 14 is placed upon the tray 15, and the pawl 1 is further lowered from the position shown in FIG. 2(b). At this time, the projection piece 17 of the pawl 1 hits against the pawl opening roller 7 to rotate the pawl 1 a predetermined amount around the mounting shaft 16 in one direction away from the tray 15 as shown in FIG. 2(c). According to the rotation of the pawl 1 by said predetermined amount, the direction along which the tension exerted by spring 4 acts becomes closer to the center of the shaft 16. When said direction crosses over the center, the pawl 1 suddenly rotates under the tension of spring 4, and is retained in position by the pawl opening stopper 6. The pawl 1 is further lowered in this condition and approaches the bottom limit position thereof, so that the rear face 2a of the block 2 hits against the roller 8 as shown in FIG. 2(e). When the rear face 2a hits against the roller 8, the pawl 1 rotates a predetermined amount in the other direction (opposite to the former direction) around the shaft 16, so that the direction of the tension exerted by spring 4 again approaches the center of the shaft 16. When the direction crosses the center of the shaft 16, the pawl returns to the original condition and simultaneously is inserted into the stepped portion 20 on the external side wall of the tray 15. The pawl which has reached the top limit position tries to rise at this time with the tray tier 4 thereon. Although the projection piece 17 of the pawl 1 hits against the pawl opening roller 7 when the pawl 1 is on the way to its top limit position, the pawl opening roller 7 may avoid the interference easily as the bracket 19 may rotate in the direction of arrow A as shown in FIG. 2(d).

As a result, the pawl 1 may effect the tier stacking of the trays without any rubbing against the trays 15.

The present invention may serve as a tier separating apparatus for separating the trays one by one if the freedom of movement of the bracket 19 of the pawl opening roller 7 is established in the opposite direction.

As is clear from the foregoing description, according to the present invention, the pawl may be moved vertically, without any rubbing of the pawl against the tray, only by the single operation of the mechanism having the pawl opening roller the pawl returning roller, and the pawl having the projection piece. Namely, as compared with the prior art apparatus in which the vertically moving pawl rubs against the trays, powder is not produced by the present invention due to a lack of friction between the pawl and the tray. As compared with the apparatus having a plurality of driving apparatuses to prevent the friction between the pawl and the tray, the present invention is less costly and more space may be saved.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

We claim:

1. A tray stacking apparatus for stacking trays having a stepped portion into a tier, said apparatus comprising:

a tier stacking apparatus portion disposed to the side of a tray stacking location, said tier stacking apparatus portion including a pawl projecting toward the tray stacking location, said pawl having a projecting piece extending therefrom, support means on which said pawl is mounted for pivotably supporting said pawl about a pivot axis, and urging means connected to said pawl for biasing said pawl in one direction of rotation about said pivot axis when the pawl is pivoted a predetermined amount in said one direction away from the tray stacking location toward an open position and for biasing said pawl in the other direction of rotation when said pawl is pivoted a predetermined amount in said other direction from the open position thereof;

a vertical driving portion comprising drive means operatively connected to said tier stacking apparatus portion for selectively raising and lowering the pawl thereof between respective bottom and upper limit positions along a vertical path;

a pawl opening roller supported in the apparatus at a fixed first location along said path at which first location the roller contacts the projecting piece of said pawl, as the pawl is lowered by said drive means, and causes the pawl to pivot the predetermined amount in said one direction; and a pawl returning roller supported in the apparatus at a fixed second location along said path and adjacent said bottom limit position and at which second location the pawl returning roller contacts said pawl, as the pawl is lowered to said bottom limit position, and causes the pawl to pivot the predetermined amount in said other direction.

2. A tray stacking apparatus as claimed in claim 1, wherein said drive means includes a driving motor, link means connected to said motor for converting rotary output of said motor to linear vertical movement, a coupling shaft to which said support means is mounted, and a coupling member coupling said link mechanism to said coupling shaft.

3. A tray stacking apparatus for stacking trays having a stepped portion into a tier, said apparatus comprising tier stacking apparatus portion disposed across a tray stacking location from one another, each of said tier stacking apparatus portions including a pawl projecting toward the tray stacking location, said pawl having a projecting piece extending therefrom, a block on which said pawl is pivotably supported about a pivot axis, and urging means connected to said pawl for biasing said pawl in one direction of rotation about said pivot axis when the pawl is pivoted a predetermined amount in said one direction away from the tray stacking location toward an open position and for biasing said pawl in the direction of rotation when said pawl is pivoted a predetermined amount in said other direction from the open position thereof;

a vertical driving portion comprising drive means operatively connected to said tier stacking apparatus portions for selectively raising and lowering the pawls thereof along respective vertical paths between bottom and upper limit positions;

a pawl opening roller associated with each said pawl and supported in the apparatus at a fixed first location along a respective one of the vertical paths at which first location the roller contacts the projecting piece of the pawl associated therewith, as the pawl is lowered by said drive means, and causes the pawl to pivot the predetermined amount in said one direction, said opening roller being movable at said first location, as the pawl associated therewith is raised by said drive means from the bottom limit position thereof, so as to prevent the opening roller from interfering with the raising of the pawl by said drive means; and a pawl returning roller associated with each said pawl and supported in the apparatus at a fixed second location along a respective one of the vertical paths and adjacent a said bottom limit position and at which second location the pawl returning roller contacts the pawl associated therewith, as the pawl is lowered to said bottom limit position, and causes the pawl to pivot the predetermined amount in said other direction.

* * * * *